Patented July 7, 1931

1,813,341

UNITED STATES PATENT OFFICE

ORIN D. CUNNINGHAM, OF INDIANAPOLIS, INDIANA, ASSIGNOR TO PETER C. REILLY, OF INDIANAPOLIS, INDIANA

TREATMENT OF PITCHES AND TARS

No Drawing. Application filed April 30, 1925. Serial No. 27,064.

This invention relates to new and useful improvements in the manufacture of carbon products at one stage suitable for use as carbon black and at another stage suitable as a decolorizing carbon, and embraces both the processes and the products thereof. Since the final or most highly developed product is the decolorizing carbon, the process may be considered as producing this as the ultimate product.

One object is the preparation and production of a decolorizing carbon from tars and pitches of animal, vegetable or mineral (organic) origin for the decolorization of sugar solutions, oils, etc. Decolorizing carbons have not generally heretofore, been made solely from tars or pitches of animal, vegetable or mineral (organic) origin. Tars and pitches have been used as binders and in other ways in conjunction with the production of active carbons from other carbonaceous bases, but have not, in most of such processes, constituted the sole or major source of carbon for the production of a decolorizing agent.

A direct distillation of tars and pitches of animal vegetable or mineral (organic) origin yields carbon residues which are not active as decolorizers nor can they be activated with any degree of success by any known means. This can be accounted for by a consideration of the changes that take place during the distillation of tars and pitches to carbon.

Tars and pitches lack structural form, such as, for example, the microscopic cellular structure of wood, so that during the course of their carbonization by direct distillation the distillation residue collapses, finally yielding a dense compact unactivatable carbon. In the case of the carbon residue from wood, the original cellular structure, although more compact, is unchanged and the carbon atoms occupy somewhat the same relative position to one another as in the original structure, so that a highly porous carbon base results which can be very successfully activated.

Since decolorizing is a surface phenomenon, high porosity (and resulting large surface) of the carbon to be activated is one of the fundamental requirements for the production of a carbon of high decolorizing power.

Another essential in the production of an active carbon appears to be a low carbonization temperature. Organic substances which decompose at low temperatures yield largely so-called "primary carbon" which can be activated. Hydrocarbons decomposing above this temperature yield so-called "secondary carbon" which is of a form that cannot be activated or easily separated from the "primary carbon" and consequently inhibits the activation of the latter.

In a direct distillation of tars and pitches to coke a highly porous residue toward the end of the distillation (as hereinafter disclosed) would allow the free escape of hydrocarbon vapors and decrease any tendency to the formation of secondary carbon by the decomposition of hydrocarbon vapors to carbon at high temperatures.

The fundamental problem, then, in the production of a decolorizing carbon of high activity from tars or pitches, is to impart in some way to the pitches or tars during their carbonization a fine cellular structure of sufficient stability and continuance that it will ultimately be imparted to the carbon residue.

This has been obtained in the present invention largely due to the fact that the molten alkalies sodium hydroxide and potassium hydroxide emulsify with tars or fused pitches to a very fine degree of dispersion, and in this condition react with the tars or pitches physically and chemically in such a way that carbonization of the tars or pitches in the presence of these alkalies yields a highly porous carbon residue; the finely dispersed molten alkali physically acting as a spacing agent and chemically reacting with the tars and pitches, the latter resulting in the evolution of a large quantity of finely dispersed gases which sweep out the hydrocarbon vapors as soon as they are formed and keeps the mass in a porous spongy condition (due to the fine dispersion of the gases) until finally the residue becomes sufficiently rigid and firm that this structure is fixed and permanent.

The emulsion of molten alkali with pitches is easily obtained and very stable. If, after the emulsion is obtained, the pitch is allowed to cool, a fresh cleavage surface shows a smooth polished black surface of perfect homogeneity to the naked eye. The touch of the tongue to the surface, however, shows the presence of alkali.

Since the novelty of this process lies essentially in artificially spacing tars and pitches during their distillation to carbon, so that a fine cellular carbon structure is obtained, I do not limit myself to the use of sodium and potassium hydroxide, but may use any substance, organic or inorganic, or combination of substances which may be finely dispersed as a solid or liquid in the tar or pitch and which during the carbonization of the tar or pitch may or may not decompose, or which may or may not react with the tars and pitches to yield gases and vapor in a highly dispersed condition and on the basis of this classification might have the following classes of substances:

(1) Extractable highly dispersed solid substances, e. g. magnesium oxide, MgO, calcium oxide CaO.

Magnesium and calcium oxides melt (1890–1940° C. and 1378° C. respectively) far above the carbonizing temperatures of tars and pitches, are chemically inert (very probably) and extractable with acids. Their effect as a spacing agent is purely physical. Precipitated calcium carbonate can be likewise employed.

(2) Extractable highly dispersed solid substances, which decompose to yield highly dispersed gases or vapors, e. g. (a) calcium hydroxide (or slaked lime), (b) magnesium carbonate.

Calcium hydroxide, during the carbonizing of tars and pitches, decomposes to calcium oxide and water vapor

and magnesium carbonate decomposes to magnesum oxide and carbon dioxide gas

so that these substances, in addition to the spacing effect of highly dispersed extractable solids, space the tars and pitches during their carbonization further by liberating a highly dispersed vapor and gas respectively.

This classification might be extended to include highly dispersed solid substances that react with tars and pitches to yield dispersed vapors or gases.

(3) Extractable highly dispersed liquid substances, organic and inorganic, which are non-decomposable and non-volatile at the carbonizing temperature of tars and pitches, e. g. (a) cuprous chloride (67 per cent.) and potassium chloride (33 per cent.) eutictic mixture (inorganic); liquid at 136° C., or (b) relatively stable and non-volatile portions of mineral oils (organic).

The above substances are some that might fall into this classification. Their effect as a spacing agent is purely physical.

(4) Extractable highly dispersed liquid (A) substances (inorganic) that react with tars to form highly dispersed gases or vapors, e. g. (a) potassium hydroxide, (b) sodium hydroxide, or (B) substances (organic salts) that decompose to yield highly dispersed gases and vapors, and inorganic salts, e. g. (a) sodium cresylates, (b) sodium salts of fatty acids (soap).

Division (B) of this classification might include inorganic-organic substances foreign to tars, and pitches, such as soaps, or it might include inorganic-organic substances common to tars and pitches, such as sodium cresylates, etc.

In the carbonization of tars and pitches in the presence of the substances that come under class (4) as compared to substances mentioned under any of the other classes, there is one point of difference in the mechanism of the charring process that should be pointed out. In class 4 there is present, either being added or formed during the carbonization process, inorganic-organic substances which decompose to carbon, usually at a lower temperature, than the corresponding organic compounds themselves as takes place in the charring process of the other classification divisions. This lowering of the average charring temperature would tend to produce a more active carbon base (primary carbon) as is well recognized in the art of making activated carbon.

The use of spacing agents in the prior modes of manufacturing activated carbon has been limited almost entirely to the objective of maintaining a porous structure (cellular or otherwise) originally present in the raw material for charring. My objective in the use of a spacing agent is to create a porous structure in tars and pitches and to regulate my conditions of charring to obtain this same structure in the carbon obtained from these substances.

I have found that complete coking of a tar or pitch with a spacing agent of the fourth classification above given, (and especially an alkali) is not so satisfactory for the production of a high quality decolorizing carbon, as partial coking and the subsequent completion of the process by one of two methods to be described below. The partial coking is completed when the fusion mass has reached a gummy condition which product shall be designated hereinafter as "semi-coke".

A specific example of the method employed in the preparation of a highly active carbon from hydrocarbonaceous substances is illustrated by coal tar pitch and potassium hydroxide being taken as specific examples of the more general classifications already defined; one hundred parts of a coal tar pitch, (showing a 65 per cent coke residue on direct distillation), and 20 parts of potassium hydroxide are melted together, thoroughly mixed and distilled with continuous stirring until 13-17 per cent. is driven off and until the fusion mass has reached a gummy consistency. This may require a heat of about 400° C. thereby forming a semi-coke. The stirrer should be of kneading type to satisfactorily handle the doughy mass which is formed toward the end of this step in the process. It should also closely fit the walls of the distillation vessel so as to obtain a complete incorporation and emulsification of the molten pitch and alkali.

This step in the procedure can be modified by fusing the pitch and potassium hydroxide separately, and then mixing, or the pitch may be partly distilled before the alkali is added.

The heating process is stopped when the mass acquires a spongy condition in which stirring by hand with a paddle becomes difficult. The material then has a consistency somewhat resembling bread dough, before baking. The heating is stopped when the maximum amount of fine porosity exists in the semi-coke.

The "semi-coke" may be described as a spongy structure exhibiting throughout its body a cellular formation having large and small cells or pores separated from each other by thin walls and presenting an extensive surface area, which would be partially lost by continuing the distillation.

The amount of emulsifying agent stated in this example is given by way of example only. The preferred amount to be used in any particular case will depend on the specific agent used, quality of the pitch and other factors.

The next step in the treatment of the semi-coke accordingly consists in separating the remainder of the volatile matter. This may be accomplished in several ways, of which I cite two, namely (1) an extraction method and (2) a sublimation method (the latter to be described further on).

The extraction method can be accomplished by extracting the semi-coke with a suitable solvent for non-carbon materials, such solvents being light coal tar oils or acetone, etc. This extraction may be conducted at room temperature or raised temperature and is preferably continued as long as the solvent dissolves out any substances from the "semi-coke."

The next step in the process consists in leaching the obtained carbon with water, and then dilute hydrochloric acid to free it of the alkali used in preparing the "semi-coke." For the purpose of complete elimination of hydrocarbons the leached carbon is dried, and calcined preferably at 900° C. in the absence of an oxidizing atmosphere. The calcined carbon, which has only a slight decolorizing activity, is activated by partially burning it up (at about 700 to 1,000° C.) with combustion gases or steam. The carbon during the activation treatment should be mechanically stirred.

In practice, very favorable results in the activation step have been secured by heating to about 875° C., and by burning up about 25 to 50 percent. (say 44 percent.) of the material at that temperature by means of steam or chimney gases.

After the activation step it is preferable to again extract with acid and to wash thoroughly with water. In both these acid treatment steps, I may boil the material in say 5 to 10 per cent. hydrochloric acid, then wash thoroughly with water.

The sublimation process (mentioned above as the equivalent for the extraction process) may be conducted by powdering the "semi-coke," e. g. by a wet grinding process, mixing therewith a chemically inert powdered spacing material, such as charcoal, diatomaceous earth, slaked lime, etc. to prevent the "semi-coke" particles coming in direct contact with one another and fusing or sintering, and then slowly vaporizing the volatile matter. The most ideal spacing material, of course, would be a carbon that itself can be activated, e. g., powdered corn-cob char.

The vaporization of the volatile matter from the "semi-coke" by the sublimation method is essentially, as the name indicates, a sublimation process. The success of the method lies in the vaporization of the hydrocarbons without actually liquefying or rendering the particles sticky by softening too much. In this way each particle of the powdered "semi-coke" is individually coked, so to speak, and results in a finer and more porous structure than would be obtained by a massive coking.

In the sublimation method, the "semi-coke" is wet-ground say in a ball mill (using as little water as possible) and then dried in some such device as a continuously operated revolving retort fitted with scrapers to keep the material from clinging to the walls. During the drying operation, the powdered "semi-coke" cakes and needs to be reground. The powdered "semi-coke" is then mixed with corn-cob char (or other inert spacing material) in the ratio of say 100 parts to 20 parts, placed (for example) in a continuously operated revolving retort, provided with scrapers as above, and the voltatile matter sublimed by a slow vaporization, sublimation being complete at 500° C. or thereabout.

It is possible to add the spacing agent to the "semi-coke" at the time it is wet-ground in a ball mill. In the sublimation of the volatile matter, steam (or other inert gas or vapor) may be passed through the retort to sweep out the hydrocarbon vapors.

By both the extraction and sublimation methods, I maintain the porosity artificially produced in the semi-coke. The high porosity of the final product is an important factor in its usefulness as decolorizing carbon.

From this stage on, the treatment of the material from the sublimation method is identical with the treatment of that from the extraction method, namely acid treatment, washing, calcining and activation, as above described.

It is to be understood that the amount of spacing agent used in the sublimation step can be widely varied from that above given, and that the same can in some cases be entirely omitted. In this latter case, the temperature in the sublimation step must be raised very carefully and gradually and a more careful regulation of the various factors must be had.

Methods other than the sublimation and extraction processes may be used for the carbonization of the tar or pitch and alkali fusion mixture, these two methods being mentioned merely as specific examples. For instance, as another example, the tar or pitch and alkali emulsion may be distilled directly to carbon in one operation. This method gives a porous carbon residue which can be pulverized, leached and activated as already described.

The application of the decolorizing carbon prepared above is specifically in the field of decolorization of sugar solution, oils, etc., but may be applied to other fields in which activated carbons have been found to be useful.

The treatment of pitch has been described in detail. This same treatment is carried out when tar forms the starting material, but obviously the proportions would be somewhat different. Thus when using coal tar of ordinary grade, I might emulsify 100 parts of tar with 10 parts of potassium hydroxide, distill off until the "semi-coke" stage as above described has been reached. The rest of the process can be as above described.

The decolorizing carbon product produced by the present process (in the finely pulverized state) is highly porous, as compared with the degree of porosity of other decolorizing carbons, is of an intensely black color, is free of sulphur, free or substantially free of ash, (ash not over 1 per cent. and usually not over ½ percent), a cubic foot of the product weighs about 22 lbs., its decolorizing power (when a reasonable amount of the carbon is burned up in the activation stage) is as high as (or in many cases higher than) the best of the decolorizing carbons heretofore on the market. It has a microscopic structure which is different from that of other decolorizing carbons.

The revivification of the pitch-carbon, after use, can be effected by the standard methods in use for other kinds of decolorizing carbon.

While I have described either tar or pitch as being the material treated, it is evident that an admixture of the materials described may be employed in carrying out my process.

What is claimed:

1. A process of carbonizing pitches, tars and like material which comprises heating to carbonization an emulsion of such material with a substance which is liquid and not substantially volatile at the temperature of carbonization of the said material.

2. A process which comprises emulsifying tarry-pitchy material with a fused non-volatile alkali compound and heating sufficiently to convert the said tarry-pitchy material into a semi-coked product.

3. A process which comprises emulsifying tarry-pitchy material with a fused non-volatile alkali compound and heating sufficiently to convert the said tarry-pitchy material into a semi-coked product and removing the bulk of the volatile matter from such semi-coked product without destroying the physical structure thereof.

4. A process of carbonizing pitches, tars and like material which comprises heating to a partial carbonization, an emulsion of such material with a substance which is liquid and not substantially volatile at the temperature of carbonization of the said material, thereafter heating the partially carbonized material with a spacing agent to carbonization, and finally activating.

5. In making carbonaceous material the step of carbonizing a tarry-pitchy material in association with an emulsified substance capable of being dissolved away from the carbonized pitchy material at a temperature below 600° C.

6. A process of carbonizing tarry-pitchy material in the form of an emulsion at a temperature below 600° C.

7. A process of partially carbonizing tarry pitchy material while in the form of an emulsion and at a temperature below 600° C., until a semi-coke is produced, which semi-coke is a solid at normal room temperature and is still capable of liberating hydrocarbon vapors at a higher temperature.

8. A process of partially carbonizing tarry pitchy material while in the form of an emulsion and at a temperature below 600° C., until a semi-coke is produced, which semi-coke is a solid at normal room temperature and is still capable of liberating hydrocarbon vapors at a higher temperature and thereafter removing hydrocarbon materials from said semi-coke so as to leave the structure of the semi-coke substantially the same.

9. A process of carbonizing tarry pitchy material while in the form of an emulsion and at a temperature below 600° C., one phase of said emulsion consisting, in part at least, of a substantially non-volatile compound of an alkali-forming metal.

10. A process of carbonizing tarry pitchy material in the form of an emulsion and at a temperature below 600° C., one phase of said emulsion consisting, in part at least, of an easily fusible but substantially non-volatile compound of an alkali-forming metal.

11. In the process of making a carbon product from tars and pitches, the steps which consist in thoroughly mixing such material with a non-volatile alkali and then distilling to the stage of a semi-coke.

12. In the process of making a carbon product from tars and pitches, the step which consists in thoroughly mixing such material with a non-volatile alkali in a molten state.

13. In the process of making a carbon product from tars and pitches the step which consists in thoroughly mixing such material with a molten non-volatile alkali and distilling the hydrocarbonaceous substances to a residue of solid carbon.

14. In the process of making a carbon product from tars and pitches, the step which consists in thoroughly mixing such material with a non-volatile alkali in a molten state and distilling the hydrocarbonaceous substances to a semi-coke which, at room temperature, is a solid.

15. That process of producing a decolorizing carbon by taking a body of tarry pitchy material, admixing the same with an emulsifying agent and at a temperture below 600° C., thereafter subjecting the admixture to a distilling action whereby a mass presenting a highly cellular structure is produced, and finally activating the mass.

16. That process of producing a decolorizing carbon by taking a body of tarry pitchy material, admixing the same with an emulsifying agent at a temperature below 600° C., and subjecting the resulting emulsion to a distilling action at a temperature high enough to decompose the pitchy material whereby a mass presenting a highly cellular structure is produced, and finally subjecting the material to an activating treatment.

17. That process of producing a decolorizing carbon which consists in subjecting an admixture of a hydrocarbon material and an emulsifying agent to a distilling action and thereby producing a highly cellular mass structure; removing the emulsifying agent; and finally subjecting the cellular mass to an activating agent.

18. The process of producing carbon suitable for decolorizing which consists in carbonizing pitchy material in the presence of a medium containing inorganic-organic compounds, whereby the temperature necessary to effect carbonization will be lower than would be necessary with the pitchy material alone.

19. A process of carbonizing tars and pitches which comprises heating to carbonization a composition consisting essentially of the tars and pitches artificially dispersed by highly dispersed substances, which substances are substantially non-volatile at a coking temperature.

20. A process of carbonizing tars and pitches which comprises heating to carbonization a composition consisting essentially of the tars and pitches artificially dispersed by highly dispersed extractable substances, which substances are substantially non-volatile at a coking temperature.

21. Semi-coked pitch of a spongelike structure carrying a finely divided extraneous extractable substance distributed throughout its body.

22. A decolorizing carbon consisting essentially of an activated tar pitch carbon.

23. In the process of making a carbon product from tars and pitches the step of carbonizing such material in association with an emulsified substance not substantially volatile at the temperature of carbonization and capable of being dissolved away from the carbonized tar or pitch.

24. In the process of making a carbonaceous semi-coked product from tars or pitches the step of partially carbonizing such material in association with an emulsified substance not substantially volatile at the temperature of carbonization and capable of being dissolved away from the partially carbonized tar or pitch.

25. In making carbonaceous material the step of carbonizing a mixture consisting essentially of a pitchy material in association with an emulsified substance capable of being dissolved away from the carbonized pitchy material.

26. In making carbonaceous material the step of carbonizing a dispersion consisting essentially of tar pitch in association with a spacing agent capable of being removed from the carbonized pitchy material, and thereafter removing the spacing material.

27. A process which comprises producing an intimate mixture consisting essentially of a tar pitch with fine particles of a readily extractable mineral substance and carbonizing the pitchy material in such mixture while the latter is substantially alone and thereafter extracting the said mineral substance.

28. In the process of producing a decolorizing carbon having a cellular structure, the steps which comprise forming a dispersion consisting essentially of a tar pitch and a finely divided extractable spacing material which is substantially non-volatile at the temperature at which such pitchy material will carbonize, and heating such dispersion, substantially by itself, to a temperature sufficient to carbonize such pitch, and thereafter removing the spacing material.

29. In the process of producing a decolorizing carbon having a cellular structure, the steps which comprise forming a dispersion consisting essentially of a tar pitch and a chemical spacing material adapted to react with such pitch to give a product which during carbonization of the pitch will be converted into a readily extractable substance, which chemical is substantially non-volatile at the temperature at which such pitchy material will carbonize, and heating such dispersion, substantially by itself, to a temperature sufficient to carbonize such pitch, and thereafter removing the spacing material.

In testimony whereof I have signed my name to this specification.

ORIN D. CUNNINGHAM.